Patented Jan. 25, 1938

2,106,239

UNITED STATES PATENT OFFICE 2,106,239

PROCESS FOR BREAKING PETROLEUM EMULSIONS

Melvin De Groote, St. Louis, Mo., assignor to The Tret-O-Lite Company, Webster Groves, Mo., a corporation of Missouri No Drawing. Application March 17, 1937, Serial No. 131,402

7 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of my invention is to provide a novel, inexpensive and efficient process for separating emulsions of the kind referred to into their component parts of oil and water or brine.

Briefly described, my process consists in subjecting a petroleum emulsion to the action of a treating agent comprising a water-soluble surface-active material of the cation-active type, of the kind hereinafter described.

Surface-active substances may be defined as compounds, which, when dissolved in water, lower the interfacial free energy between the water and one or more of its neighboring phases, and in addition, are present at higher concentrations at the interface than in the bulk of the solution; while also they are frequently arranged in a more or less definitely oriented arrangement. The solution or sol. thus obtained usually possesses marked frothing or foaming properties, and also usually the ability to produce oil-in-water emulsions. Such sol. or solution has strong wetting properties and sometimes detergent properties.

Although there are many such surface-active materials, especially of the anion-active type, only certain ones have found application in the art of breaking petroleum emulsions. Incidentally, many substances have found application in the art of breaking petroleum emulsions which are devoid of surface-active properties when measured by the usual criteria. For this reason, as well as other reasons, surface-activity alone is not an index of demulsifying power.

The type of surface-active materials conventionally employed in breaking petroleum emulsions, are such materials as soaps, resinates, naphthenates, salts of petroleum sulfonic acids, salts of fatty sulfates, salts of fatty sulfonates, salts of fatty sulfoaromatic acids, dialkyl sulfates, salts of alkylated naphthalene sulfonic acids, and salts of similar nuclear substituted naphthalene sulfonic acids and the like. Although these substances may be used in the form of acids of esters, ammonium salts, amine salts, sodium salts, etc., they are more commonly used in the form of a simple salt, on account of economy and freedom of corrosion. For the sake of simplicity, such materials may be expressed by the formula: X.TNa where X represents an aliphatic chain, a non-aromatic cyclic ring, or a substituted aromatic or hydro-aromatic nucleus, T represents an acid residue, such as a COO radical, an $SO_3$ radical derived from the conventional sulfonic acid radical, or an $SO_4$ radical derived from an acid sulfate radical. Specific examples are: sodium oleate, sodium resinate, sodium naphthenate, sodium salt of oleic acid hydrogen hydrogen sulfate, sodium salt of sulforicinoleic acid, sodium salt of sulfo-benzene stearic acid, cetyl sodium sulfonate, sodium salts of sulfo-aromatic esters of fatty acids, sodium salts of sulfo-aliphatic esters of fatty acids, etc.

All these materials are characterized by the fact that in solution, they ionize so as to give a sodium ion with a positive charge and an (X.T) ion having a negative charge. In a case of sodium oleate, of course, one obtains the sodium ion with a positive charge, and an oleate ion with a negative charge.

It is to be noted that in all these instances, it is not the sodium atom or the sodium ion which gives the characteristic surface-active properties, but it is the remainder of the molecule, that is, the radical, which has been denoted as the (X.T) radical. The (X.T) radical contributes the anion, and thus all the previously described surface-active materials may be considered as being anion-active.

I have found that certain surface-active substances which are cation-active are effective demulsifying agents for petroleum emulsions. The particular type of cation-active material contemplated for use is a salt of a quaternary phosphonium base derived from a non-surface-active acid, such as hydrochloric acid, sulfuric acid, nitric acid, phosphoric acid, methyl sulfuric acid (methyl hydrogen sulfate), ethyl sulfuric acid (ethyl hydrogen sulfate), propyl sulfuric acid (propyl hydrogen sulfate) and the like.

Such surface-active substances may be produced in various ways. Generally speaking, basic compounds or salts thereof containing pentavalent phosphorus, as, for example, trimethyloctylphosphonium hydroxide, are obtainable by the following reactions:

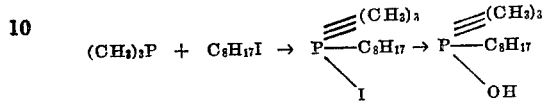

Triethylcetylphosphonium bromide is obtainable as indicated by the following reaction:

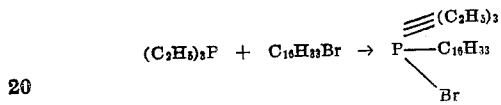

Such bromide may be, of course, converted into the base reacting with alkali compounds in a conventional manner. Similarly, octodecyltriethylphosphonium bromide may be obtained as indicated by the following reaction:

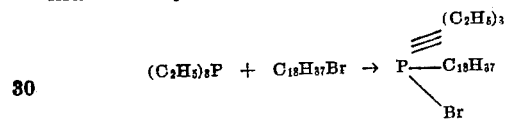

Other phosphonium derivatives which are basic in character or may be converted into bases, or may be employed in the form of salts, such as the halide, that is, salts of hydrobromic acid, hydrochloric acid, hydriodic acid, etc., include the following: triphenylbenzenephosphonium chloride, which may be prepared by heating benzyl chloride with triphenylphosphonium; triphenyldichlorobenzylphosphonium chloride, which may be prepared by heating 3.4-dichlorobenzyl chloride with triphenylphosphine (see Annalen der Chimie, vol. 146, page 326, vol. 152, page 224, and vol. 179, page 283).

The acid sulfates derived from alcohols having six carbon atoms or less, hexyl hydrogen sulfate (hexyl sulfuric acid), amyl hydrogen sulfate (amyl sulfuric acid), butyl hydrogen sulfate (butyl sulfuric acid), are the most desirable type of acids to furnish the non-surface-active negative radical. My preferred reagent is obtained by reacting propyl hydrogen sulfate with trimethyloctylphosphonium hydroxide, so as to yield trimethyloctylphosphonium propyl sulfate.

Quaternary phosphonium compounds are commonly available in the form of chloride, bromides, iodides, and sometimes in the form of hydroxides. The halides are, of course, surface-active. Since the surface-active effect cannot be due to the chloride or bromide ion, it is obviously due to the action which represents a sulphonium radical of the kind described. Such cations, of course, carry a positive charge and solutions of such materials would be expected to charge adsorbed surfaces positively, or else to neutralize negative charges.

The type of phosphonium compound employed must contain at least one organic radical having at least six carbon atoms attached to the pentavalent phosphorus atom. It is immaterial how many carbon atoms are present in the various organic radicals, preferably aliphatic radicals, attached to the pentavalent phosphorus atom, although suitable reagents are not obtainable when the number of carbon atoms introduced in the phosphonium radical exceeds 50, and generally speaking, the most desirable ones are obtained wherein the total number of carbon atoms attached to the phosphorus atom is within the range of 15–35.

Thus the surface-active material used as a demulsifying agent in the present process may be described as being of the type:

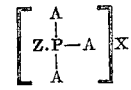

in which Z represents any hydrocarbon radical having at least six carbon atoms, A represents a substituent radical for another hydrogen atom of the phosphonium radical and may be a methyl radical, ethyl radical, etc.; AA may be replaced by a single divalent radical, such as a $C_2H_4$ radical, a $C_3H_6$ radical, or the like; AAA may represent a single trivalent radical, such as a $C_3H_5$ radical; the total number of carbon atoms in AAAZ is preferably not over 35; X represents a non-surface-active component or anion, such as a chlorine or bromine atom, or an ion or an equivalent radical, such as a methyl sulfuric acid radical, an ethyl sulfuric acid radical, a propyl sulfuric acid radical, derived from an alcohol, regardless of its particular isomeric form, having not over six carbon atoms.

Recently there have been available alcohols derived from naphthenic acids instead of fatty acids. Such alcohols can be converted into halides, and such naphthenyl halides can be used to replace lauryl halides, octodecyl halides dodecyl halides, and the like, in the manufacture of phosphonium compounds of the kind contemplated for use as demulsifying agents in the present process. Materials so obtained would show markedly greater solubility in oil and similar materials derived from fatty acid compounds, even though they still show valuable surface-active properties when dissolved in water. Aralkyl halides such as benzyl chloride may be employed in place of methyl chloride or the like, so as to introduce a monovalent hydrocarbon radical, other than an aliphatic radical.

The specific form, state, or condition of the treating agent at the time it is used or applied to the emulsion to be treated is immaterial and may be varied to suit existing conditions. It can be used in substantially anhydrous state or in solutions of any convenient strength. The treating agent may be diluted with any suitable solvent, such as ethyl alcohol, methyl alcohol, isopropyl alcohol, butyl alcohol, kerosene, or any other hydrocarbon solvent, benzol, xylene, solvent naphtha, carbon tetrachloride, pine oil, etc.

These materials may be employed alone or in combination with other recognized demulsifying agents, such as water softeners, modified fatty acids, salts of petroleum sulfonic acids, alkylated aromatic sulfonic acids, derivatives of polybasic carboxy acids, and the like.

Reference is made to U. S. Patent No. 2,050,924, dated August 11, 1936, to Melvin De Groote. This patent describes a process for breaking petroleum emulsions by means of similar compounds derived from the quaternary ammonium radical instead of the quaternary phosphonium radical. I have found that it is particularly desirable to mix the compounds of the kind described in the present instance with ammonium compounds of the kind described in said De Groote patent, in which the anion of the quaternary ammonium compound is derived from an alkyl sulfuric acid, such as propyl sulfuric acid, butyl sulfuric acid, etc., having not over six carbon atoms in the alkyl radical.

Conventional demulsifying agents employed in the treatment of oil field emulsions are used as such, or after dilution with any suitable solvent, such as water; petroleum hydrocarbons, such as gasoline, kerosene, stove oil; a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohols, butyl alcohols, hexyl alcohols, octyl alcohols, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of my process may be admixed with one or more of the solvents customarily used in connection with conventional demulsifying agents.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000, or 1 to 20,000, or even 1 to 30,000, such an apparent insolubility in oil and water is not significant, because said reagents undoubtedly have solubility within the concentration employed. This same fact is true in regard to the material or materials employed as the demulsifying agent of my process.

I desire to point out that the superiority of the reagent or demulsifying agent contemplated in my process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but I have found that such a demulsifying agent has commercial value, as it will economically break or resolve oil field emulsions in a number of cases which cannot be treated as easily or at so low a cost with the demulsifying agents heretofore available.

In practicing my process, a treating agent or demulsifying agent of the kind above described is brought into contact with or caused to act upon the emulsion to be treated in any of the various ways, or by any of the various apparatus now generally employed to resolve or break petroleum emulsions with a chemical reagent, or may be employed co-jointly in combination with other non-chemical processes intended to effect demulsification.

Having thus described my invention, what I claim as new and desire to secure by Letters Patent is:

1. A process for breaking petroleum emulsions of the water-in-oil type, which consists in subjecting the emulsion to the action of a cation-active, surface-active substance of the formula type:

in which Z represents any monovalent hydrocarbon radical having at least six carbon atoms; AAA represents at least one hydrocarbon radical, and not more than three hydrocarbon radicals which replace three hydrogen atoms of the phosphonium radical; said hydrocarbon radicals being selected from the class consisting of monovalent hydrocarbon radicals, divalent hydrocarbon radicals, and trivalent hydrocarbon radicals, with the proviso that the total valency value of AAA shall be 3; and X represents a non-surface-active negative radical or component, the total number of carbon atoms represented in AAAZ being not over thirty-five.

2. A process for breaking petroleum emulsions of the water-in-oil type, which consists in subjecting the emulsion to the action of a cation-active, surface-active substance of the formula type:

in which Z represents any monovalent aliphatic hydrocarbon radical having at least six carbon atoms; AAA represents at least one hydrocarbon radical, and not more than three hydrocarbon radicals which replace three hydrogen atoms of the phosphonium radical; said hydrocarbon radicals being selected from the class consisting of monovalent hydrocarbon radicals, divalent hydrocarbon radicals, and trivalent hydrocarbon radicals, with the proviso that the total valency value of AAA shall be 3; and X represents a non-surface-active negative radical or component, the total number of carbon atoms represented in AAAZ being not over thirty-five.

3. A process for breaking petroleum emulsions of the water-in-oil type, which consists in subjecting the emulsion to the action of a cation-active, surface-active substance of the formula type:

in which Z represents any monovalent aliphatic hydrocarbon radical having at least twelve carbon atoms and not over twenty-two carbon atoms; AAA represents at least one hydrocarbon radical, and not more than three hydrocarbon radicals which replace three hydrogen atoms of the phosphonium radical; said hydrocarbon radicals being selected from the class consisting of monovalent hydrocarbon radicals, divalent hydrocarbon radicals, and trivalent hydrocarbon radicals, with the proviso that the total valency value of AAA shall be 3; and X represents a non-surface-active negative radical or component, the total number of carbon atoms represented in AAAZ being not over thirty-five.

4. A process for breaking petroleum emulsions of the water-in-oil type, which consists in subjecting the emulsion to the action of a cation-active, surface-active substance of the formula type:

in which Z represents any monovalent aliphatic hydrocarbon radical having at least twelve carbon atoms and not over twenty-two carbon atoms; A represents a substituent hydrocarbon radical to replace a hydrogen atom of the phosphonium radical; and X represents a non-surface-active negative radical or component.

5. A process for breaking petroleum emulsions of the water-in-oil type, which consists in subjecting the emulsion to the action of a cation-active, surface-active substance of the formula type:

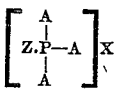

in which Z represents any monovalent aliphatic hydrocarbon radical having at least twelve carbon atoms and not over twenty-two carbon atoms; A represents a substituent hydrocarbon radical to replace a hydrogen atom of the phosphonium radical; and X represents a halogen atom or ion.

6. A process for breaking petroleum emulsions of the water-in-oil type, which consists in subjecting the emulsion to the action of a cation-active, surface-active substance of the formula type:

in which Z represents any monovalent aliphatic hydrocarbon radical having at least twelve carbon atoms and not over twenty-two carbon atoms; A represents a substituent hydrocarbon radical to replace a hydrogen atom of the phosphonium radical; and X represents an alkyl sulfuric acid radical having not over six carbon atoms.

7. A process for breaking petroleum emulsions of the water-in-oil type, which consists in subjecting the emulsion to the action of a cation-active, surface-active substance of the formula type:

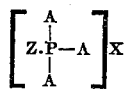

in which Z represents any monovalent aliphatic hydrocarbon radical having at least twelve carbon atoms and not over twenty-two carbon atoms; A represents a substituent hydrocarbon radical to replace a hydrogen atom of the phosphonium radical; and X represents a propyl sulfuric acid radical.

MELVIN DE GROOTE.